United States Patent [19]
Yamamura et al.

[11] Patent Number: 5,575,831
[45] Date of Patent: Nov. 19, 1996

[54] METHOD FOR PRODUCING HYDROGEN STORAGE ALLOY

[75] Inventors: Yasuharu Yamamura, Katano; Hajime Seri, Izumiotsu; Yoichiro Tsuji, Hirakata; Naoko Owada, Katano; Tsutomu Iwaki, Yawata, all of Japan

[73] Assignee: Matsushita Electric Industrial Co., Ltd., Osaka, Japan

[21] Appl. No.: 201,602

[22] Filed: Feb. 25, 1994

[30] Foreign Application Priority Data

Mar. 1, 1993 [JP] Japan ................ 5-039622

[51] Int. Cl.⁶ .............. C22B 34/14; C22B 34/22
[52] U.S. Cl. ............... 75/614; 75/622; 420/900
[58] Field of Search ............. 75/609, 613, 614, 75/622; 420/900

[56] References Cited

U.S. PATENT DOCUMENTS

| | | | |
|---|---|---|---|
| 2,537,068 | 1/1951 | Lilliendahl et al. . | |
| 2,653,869 | 9/1953 | Gregory et al. . | |
| 3,014,797 | 12/1961 | Elischer | 75/614 |
| 4,565,686 | 1/1986 | Kumar | 420/900 |
| 4,605,603 | 8/1986 | Kanda et al. | 420/900 |
| 4,663,143 | 5/1987 | Wallace et al. | 420/900 |
| 4,898,794 | 2/1990 | Doi et al. | 420/900 |
| 4,983,474 | 1/1991 | Doi et al. | 420/900 |
| 5,002,730 | 3/1991 | Fetcenko | 420/424 |
| 5,096,667 | 3/1992 | Fetcenko | 420/900 |
| 5,149,383 | 9/1992 | Seri et al. | 420/900 |
| 5,205,985 | 4/1993 | Seri et al. | 420/900 |
| 5,278,001 | 1/1994 | Ono et al. | 420/900 |

FOREIGN PATENT DOCUMENTS

| | | |
|---|---|---|
| 0410935 | 1/1991 | European Pat. Off. . |
| 2223150 | 9/1990 | Japan . |
| 3170601 | 7/1991 | Japan . |
| 5163511 | 6/1993 | Japan . |

*Primary Examiner*—George Wyszomierski
*Attorney, Agent, or Firm*—Panitch Schwarze Jacobs & Nadel, P.C.

[57] ABSTRACT

In a method for producing a multi-component hydrogen storage alloy including metals of zirconium or vanadium, oxides of these metals is used to produce an alloy having characteristics equivalent to that produced with pure metals. It comprises steps of calcining the raw material, wherein at least one selected from the group consisting of zirconium and vanadium is included in its oxide form, at a temperature ranging from 900° C. to 1300° C., mixing metal calcium with said calcined raw material, and treating the mixture with heat at a temperature ranging from the melting point of metal calcium to 1300° C., under inert gas atmosphere.

19 Claims, 4 Drawing Sheets

METHOD FOR PRODUCING HYDROGEN STORAGE ALLOY

BACKGROUND OF THE INVENTION

1. Field of the Invention

The present invention relates to a method for producing a hydrogen storage alloy which can electrochemically absorb and desorb hydrogen in a reversible manner.

2. Description of the Related Art

Storage batteries, which are widely used as power sources in a variety of applications, are typically classified into two general groups of lead-acid storage batteries and alkaline storage batteries. Between the two groups, alkaline storage batteries tend to be more reliable, and can be made smaller and lighter. Small alkaline storage batteries are generally favored for portable electric appliances, while large alkaline storage batteries have been used mainly in conjunction with industrial equipments.

While some alkaline storage batteries use air or silver oxide for their positive electrode material, majority of the positive electrodes are of nickel. Nickel electrodes have been particularly popular since they were reconfigured from a pocket type to a sintered type, and became even more popular with the development of hermetic-sealing.

Cadmium is most commonly used to form the negative electrode of alkaline storage batteries, however other materials, including zinc, iron, hydrogen, and the like have also been employed.

There is considerable commercial interest in storage batteries that have a higher energy density than batteries currently available. Toward achieving this goal, researchers have investigated nickel-hydrogen storage batteries which comprise hydrogen storage electrodes. A number of proposals have been made on the production method of the hydrogen storage electrodes using metal hydrides.

The alloys in these electrodes, or the hydrides form of such alloys, can absorb and desorb hydrogen in a reversible manner, and thus the alloys and the electrodes made from these alloys have come to be known as hydrogen storage alloys and hydrogen storage electrodes (or hydrogen storage alloy electrodes), respectively.

Batteries made with hydrogen storage electrodes have a larger theoretical energy density in comparison with batteries formed with cadmium electrodes. Also, batteries employing hydrogen storage electrodes are not susceptible to the formation and subsequent deformation of dendrites, which is a problem with zinc electrodes. These advantageous properties, as well as the promise for a longer cycle life and a reduction in the environmental concerns inherent in zinc- or cadmium- containing electrodes/batteries, have encouraged research into developing alloys suited for hydrogen storage electrodes, particularly negative electrodes for alkaline storage batteries.

Prior art alloys for hydrogen storage electrodes include multi-component alloys such as those of either Ti-Ni system, or La- (or Mm-) Ni system (where Mm is a misch metal). The multi-component alloy of the Ti-Ni system is classified as an AB type (where A is La, Zr, Ti or an element with a similar affinity for hydrogen, and B is Ni, Mn, Cr or any other transition metal). When this type of alloy is used as the negative electrode in an alkaline storage battery, the electrode exhibits a relatively large discharge capacity during the initial charging and discharging cycles. However, electrodes comprising these alloys have a disadvantage that they can not maintain their large discharge capacity after repeated charging and discharging cycles, i.e., do not have large saturation discharge capacities.

Another multi-component alloy is of the La- (or Mm-) Ni system, which is classified as an $AB_5$ type, where A and B are defined as above in relation to the AB type of alloy. A number of research project have recently been developed for the alloys of this system and thus the alloy have been regarded as a relatively promising alloy material for the electrodes, so far. However, the alloys of this system have several disadvantages such that they have a relatively small discharge capacity, that they have insufficient cycle life performances as the electrodes of the batteries, and that their material cost is expensive. Therefore, there has been a demand for novel alloys usable for making hydrogen storage electrodes having a large discharge capacity and a long cycle life.

A Laves phase alloy of an $AB_2$-type (where A is an element with a large affinity for hydrogen such as Zr or Ti, and B is a transition metal such as Ni, Mn or Cr) has the potential to overcome many of the shortcomings of the multi-component alloys described above. Electrodes for a storage battery formed from a Laves phase alloy of the $AB_2$-type have relatively high hydrogen storing capability and exhibit a large discharge capacity and a long cycle life. The alloys of this system however had a disadvantage that their material cost was expensive in comparison with the hydrogen storage alloys of the Ti-Ni system and the Mm-Ni system, because they contained expensive metal components such as Zr or V in large quantities.

In order to overcome the above-discussed disadvantages of the Laves phase alloy of an $AB_2$-type, there has been proposed a reduction diffusion method. According to the reduction diffusion method, in place of expensive metal materials, an inexpensive raw material containing their oxides is used, and metal calcium in an amount sufficient for reducing the oxides is mixed with the oxides, and then the mixture is subjected to a heat treatment for the reduction.

The prior art reduction diffusion method employing metal calcium as its reducing agent is a process for producing an alloy by allowing the reduced metals, for instance Zr, Ti, V, Mm and the like, as well as other metals, for instance Mn, Cr, Co and the like which have initially been incorporated in the raw material, to diffuse into the nickel powder which have been incorporated in the raw material.

It is however difficult to obtain a hydrogen storage alloy having a sufficient hydrogen storing capability by the prior art reduction diffusion method for the following reason. Depending on the particle size of the raw material nickel and the temperature distribution in the heating furnace, the reducing reaction in the prior art method would not sufficiently proceed in the interior or core of the nickel particles. Some amount of nickel would remain unreacted in the center of the particles and the alloy composition would deviate from its aimed composition depending on the regions in the produced alloy mass. This deviation in the alloy composition would deteriorate the homogeneity of the produced alloy.

SUMMARY OF THE INVENTION

It is therefore the primary object of the present invention to provide a method for producing a multi-component hydrogen storage alloy which overcomes the above-mentioned disadvantage and deficiency of the prior art method.

The present invention provides a method for producing a multi-component hydrogen storage alloy including at least one element selected from the group consisting of zirconium (Zr) and vanadium (V), wherein a raw material including at least one of Zr and V in its oxide form is subjected to a heating in the presence of metal calcium under inert gas atmosphere up to a temperature at which at least metal calcium melts, thereby reducing the oxides in said raw material.

It is preferable for the above-mentioned method to comprise further steps of;

calcining the raw material including at least one metal selected from the group consisting of zirconium and vanadium which is present as its oxide at a temperature ranging from 900° C. to 1300° C., mixing metal calcium with the calcined raw material, and treating the mixture obtained in the previous step with heat at a temperature ranging from the melting point of metal calcium to 1300° C., under inert gas atmosphere, thereby reducing the oxides in said raw material.

It also preferable for the above-mentioned method to comprise, in advance of the step of mixing metal calcium with the calcined raw material, a step of further calcining the calcined product under reducing gas atmosphere at a temperature ranging from 350° C. to 900° C.

In the above-mentioned method, it is desirable to make the amount of the metal calcium to be mixed with the raw material for the alloy in excess of stoichiometric amount required for reducing the oxides in the raw material, and therefore to make the method to further comprise a step of removing the metal calcium and calcium oxide remained in the mixture after the step of reducing the oxides.

The present invention further provides a method for producing a multi-component hydrogen storage alloy as described above, wherein the multi-component hydrogen storage alloy contains at least zirconium, and the heating step is a step of heating and melting a mixture comprising a raw material which includes Zr in its oxide form, metal calcium in an amount required for reducing the oxides included in the raw material, and an oxide of Zr in an amount up to 10 mole % of the amount of the first-mentioned Zr, under inert gas atmosphere.

According to another aspect of the present invention, there is provided a method for producing a multi-component hydrogen storage, wherein the multi-component hydrogen storage alloy contains at least zirconium and titanium as described above, in which the heating step is a step of heating and melting a mixture comprising a raw material which includes Zr and Ti in their oxide forms, metal calcium in an amount required for reducing the oxides included in the raw material, and an oxide of Zr in a molar amount which corresponds to 10% or smaller of a sum of the molar amounts of the first-mentioned Zr and Ti, under inert gas atmosphere.

DETAILED DESCRIPTION OF THE INVENTION

Figure 1:
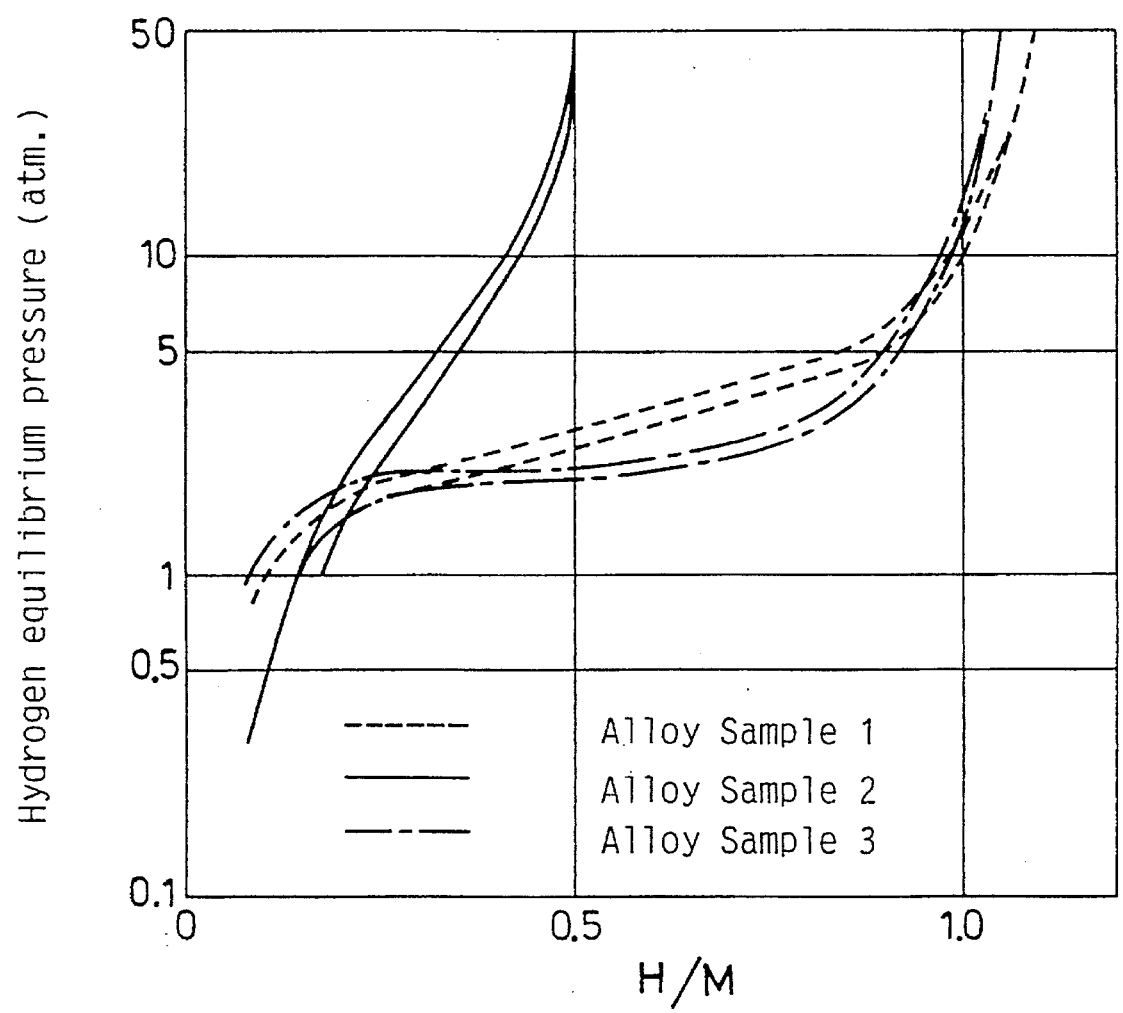
FIG. 1 is a graph showing P-C-T characteristics curves of hydrogen storage alloys produced in accordance with a working example of the present invention and with comparative preparations.

The method of the present invention commonly comprises a step of reducing metal oxide components contained in the raw material for the alloy by the reductant molten metal calcium. In the present invention, the reduction step can be embodied in two methods. One method performs the reduction step without completely melting the raw material for the alloy and another method performs the reduction step in a state wherein the raw material for the alloy is completely molten.

First, the former method will be described. In this method, the raw material for the alloy including zirconium oxide or vanadium oxide is first subjected to a calcining treatment in the air at a temperature ranging from 900° C. to 1300° C. By this calcining treatment, the oxide reacts with the metal components in the raw material to form one or more complex oxides. During this calcining treatment, the metal components are oxidized by oxygen in the air. When the oxides and the complex oxides thus obtained are reduced by the added metal calcium, a heat is generated by thermogenic oxidation reaction of the metal calcium, and hence, the temperature of the reaction region is greatly raised. By virtue of the formation of the complex oxides, the metal atoms in the metal components for constituting the alloy exists with each other in a closed state. Therefore, the alloy synthesized by the method of the present invention is excellent in its homogeneity in comparison with the alloy synthesized by the prior art reduction diffusion method.

During the above-mentioned calcining treatment, it is preferable to keep the ambient temperature to a temperature ranging from 900° C. to 1300° C. When the temperature is below 900° C., the formation of the complex oxides would not proceed sufficiently. If the temperature exceeds 1300° C., some inconvenience may be resulted therefrom. Metal components having a relatively low melting point such as manganese in the raw material would scatter therefrom at a temperature above 1300° C.

When the raw material for the alloy is subjected to the calcining treatment in the air as mentioned above, the metal components such as nickel are oxidized, and thus the amount of metal calcium required for reducing the oxides increases correspondingly. Therefore, a step for further reducing the oxides produced by the first-mentioned calcining must be added thereto. The step is another calcining treatment, whereby the raw material for the alloy including the oxides is preliminarily reduced under reducing atmosphere containing hydrogen gas or carbon monoxide gas at a temperature ranging from 350° C. to 900° C. By virtue of this preliminary reducing treatment, the amount of metal calcium to be added in the subsequent step can be reduced to a considerable extent.

According to the above-mentioned method, a hydrogen storage alloy can be produced at a relatively low temperature of 1300° C. or lower, and usually about 1100° C. In order to reduce the oxides in the raw material to the metals without completely melting the raw material for the alloy, however, metal calcium in an amount in excess of theoretical value is required. Therefore, some calcium component remains in the obtained alloy and might deteriorate the characteristics of the alloy to a certain extent.

In the working examples which will be described later, the metal calcium and calcium oxide included in the obtained alloy is dissolved to be removed by a weak acid solution such as a dilute acetic acid solution which does not substantially dissolve the alloy. This process cannot however remove the remained calcium component completely.

In the latter method, wherein the raw material for the alloy is molten by means of an arc melting furnace or the like and is allowed to react with metal calcium, the reaction of the oxide with the metal calcium is a liquid phase reaction, and hence the amount of metal calcium can be in its theoretical value. In a case wherein zirconium and titanium are contained in the aimed alloy composition, it is preferable to add an oxide of zirconium in a molar amount which corresponds to 10% or smaller of a sum of the molar amounts of zirconium and titanium in the raw material. Even in a case wherein titanium is contained in the aimed alloy composition, it is advantageous to use an excessive amount of zirconium oxide in place of titanium oxide, because zirconium oxide can more hardly be reduced than titanium oxide. In this manner, the total amount of the added metal calcium is consumed for the reduction of the oxides. Since the excessive zirconium oxide floats over the molten alloy as a slag, it can readily be separated from the resultant alloy by removing the slag.

An example of the preferred alloy to which the method of the present invention applies is represented by the formula: $ZrMn_wV_xNi_yM_z$ (where M represents at least one element selected from the group consisting of B, Al, Si, Cr, Fe, Co, Cu, Zn, Nb, Mo, Ta and W, $0.3 \leq w \leq 1.0$, $0 < x \leq 0.4$, $0.9 \leq y \leq 1.5$, $0 < z \leq 1.0$ and $1.8 \leq w+x+y+z \leq 2.4$), and the alloy has C15-type Laves phases of a crystal structure similar to that of $MgCu_2$ as a main alloy phase, and a lattice constant "a" such that $7.05 Å \leq a \leq 7.10 Å$.

Another example of the preferred alloy is represented by the formula: $Zr_{1-a}Ti_aMn_wV_xNi_yM_z$ (where M represents at least one element selected from the group consisting of B, Al, Si, Cr, Fe, Co, Cu, Zn, Nb, Mo, Ta and W, $0.1 \leq a < 1.2$, $0.3 \leq w \leq 1.0$, $0 < x \leq 0.4$, $0.9 \leq y \leq 1.6$, $0 < z \leq 1.0$ and $1.7 \leq w+x+y+z \leq 2.7$) and the alloy has C14-type Laves phases of a crystal structure similar to that of $MgZn_2$ or C15-type Laves phases similar to that of $MgCu_2$ as a main alloy phase.

A further example is an alloy which includes an alloy phase having a main component of Ln (lanthanide elements) and Ni of 30% by weight or smaller.

In the present invention, components in the raw material for the alloy, which are desirably employed as their oxides, are those which are difficult to obtain as refined metal powders or those which are uneconomical to use in their pure metal forms. These are exemplified as titanium, boron and lanthanide elements in addition to the above-discussed zirconium and vanadium.

As clearly shown by the foregoing discussion and will be made more apparent as the following detailed description proceeds, it is possible to synthesize a hydrogen storage alloy in an economical manner with zirconium oxide and vanadium oxide which are relatively cheap in their raw material cost in accordance with the present invention. The hydrogen storage alloy thus obtained however has characteristics which are substantially equivalent to or comparable to that of the alloy synthesized in the prior art process performed on the material including metal zirconium and metal vanadium which are very expensive in their raw material cost. And thus the method is advantageous in economical point of view.

While novel features of the invention are set fourth in the preceding, the invention, both as to organization and content, can be further understood and appreciated, along with other objects and features thereof, from the following detailed description and example when taken in conjunction with the attached drawings.

In the following paragraphs, examples of the present invention will be described together with comparative preparations by referring to the attached drawings.

EXAMPLE 1

Preparation of Alloy Samples

Commercially available zirconium, manganese, vanadium, cobalt and nickel, or oxide powders of these metal as well as metal calcium were used to prepare Alloy Samples represented by the formula: $ZrMn_{0.6}V_{0.2}Co_{0.1}Ni_{1.2}$.

Alloy Sample 1 (Comparative preparation 1):

A hydrogen storage alloy was prepared by steps of melting the above-mentioned all metal materials in an arc melting furnace under argon atmosphere, cooling the molten metal and subjecting the cooled melt to a heat treatment under vacuum at 1100° C. for 12 hours.

Alloy Sample 2 (Comparative preparation 2):

In compliance with the prior art reduction diffusion method performed with a heat treatment under argon atmosphere at 1250° C., another hydrogen storage alloy was prepared by using zirconium oxide ($ZrO_2$) powder, vanadium pentoxide ($V_2O_5$) powder, manganese dioxide ($MnO_2$) powder, metal nickel powder, and metal cobalt powder, all sieved to pass 100 mesh, as well as metal calcium of 1.2 times as much as the stoichiometric amount required for reducing all of the above-mentioned oxides.

Alloy Sample 3 (Working Example):

A hydrogen storage alloy was prepared in the following manner.

First, each of the predetermined amounts of powders of 100 mesh or smaller of zirconium oxide, vanadium pentoxide, manganese dioxide, metal nickel and metal cobalt were mixed together in a mortar, and the mixture thus obtained was calcined in an alumina crucible placed in the air at 1000° C. for 3 hours. During this calcining, some of the oxides and metals in the mixture reacted with each other or one another to partially form complex oxides, and gray color of the mixed powder changed to black.

Next, metal calcium of 1.2 times as much as the stoichiometrically required amount was added to the calcined powder, and the combined powder was calcined in a calcium oxide crucible placed under argon atmosphere at 1100° C. for 8 hours.

After cooling down to room temperature, the calcined mixture was placed in an aqueous acetic acid solution of a concentration of about 10% by weight, to remove excessive metal calcium and calcium oxide produced as the reaction product. After the removal of the metal calcium and the calcium oxide, a milky white hydrogen storage alloy (Alloy Sample 3) in particles having a size of 0.2 mm–0.5 mm was obtained.

Characterization of Alloy Samples

First, a powder X-ray diffraction measurement was performed on each of these hydrogen storage alloys. As a result of the measurement, it was confirmed that the main component of each of the alloy phase in every Alloy Samples was the C15-type Laves phase (crystal structure of $MgCu_2$- type having face centered cubic structure, hereinafter referred to "fcc structure"). In Alloy Sample 1, a peak attributable to the Zr-Ni system alloy in its diffraction pattern was recognized at a diffraction angle 2θ of 38°–40°.

A crystal lattice constant "a" of Alloy Sample 2 was found to be 7.03Å, which is smaller than that of 7.06Å of Alloy Sample 1. The cause for it is believed that some calcium was presumably taken up into Alloy Sample 2. Further, it is recognized that Alloy Sample 2 had a peak attributable to the Zr-Ni system alloy in its diffraction pattern at a diffraction angle 2θ of 38°–40° as observed with Alloy Sample 1, and another peak attributable to the unreacted Ni.

Alloy Sample 3 had substantially no peak attributable to the Zr-Ni system alloy in its diffraction pattern at a diffraction angle 2θ of 38°–40° which was recognized with the both of Alloy Samples 1 and 2, and hence it was found that Alloy Sample 3 was an alloy having a very high homogeneity. A crystal lattice constant of Alloy Sample 3 was found to be 7.05Å which was slightly smaller than that of Alloy Sample 1. This is presumably attributable to the taken-up of calcium into the alloy structure.

A P-C-T (pressure-component-temperature) measurement at 70° C. was performed on each of Alloy Samples and the results thereof were shown In FIG. 1. In FIG. 1, the ordinate represents a hydrogen equilibrium pressure, and the abscissa represents an H/M value, i.e., the number of the hydrogen atoms per one metal atom in the hydrogen storage alloy.

As clearly shown in FIG. 1, it was found that Alloy Sample 1 stores about 1.1 of H/M value at a hydrogen equilibrium pressure of about 50 atm., but Alloy Sample 2 has a very small H/M value of about 0.50 at a hydrogen equilibrium pressure of about 50 atm., and no flat region or plateau as observed with Alloy Sample 1. Alloy Sample 3 has a slightly lower hydrogen equilibrium pressure than that of Alloy Sample 1, presumably due to metal calcium contained in small amount therein, but has an extended flatness in the plateau, presumably due to the improved homogeneity of the alloy. Further, the H/M value of 1.04 at a hydrogen equilibrium pressure of about 50 atm. of Alloy Sample 3 was shown to be only slightly lower than that of 1.10 of Alloy Sample 1, presumably due to metal calcium contained in small amount therein.

Half Cell Test

In order to evaluate electrode characteristics as the negative electrode (anode) of the alkaline rechargeable battery in the electrochemical charging and discharging reaction, i.e., charging/discharging cycle characteristics in particular, the following half-cell tests were performed on each of Alloy Samples.

First, each of Alloy Samples was pulverized to have a particle size of 400 mesh or smaller, and each 1 g of the alloy powders was mixed with 3 g of nickel carbonyl powder as an electrically-conductive agent and 0.12 g of polyethylene fine powder as a binder, thereafter the obtained mixture was thoroughly stirred. Then, the mixture was molded with the application of pressure into disks each having a diameter of 24.5 mm and a thickness of 2.5 mm. The obtained disks were heated for one hour at 130° C. in a vacuum to melt the binder, thereby to produce hydrogen storage electrodes.

A nickel lead wire was attached to each of the hydrogen storage alloy electrode, which served as the negative electrode. A sintered nickel electrode having a capacity greater than the capacity of the negative electrode was used for the positive electrode. The negative and positive electrodes were placed, with a separator between them, in an electrolyte solution, to produce the half-cell for the half-cell test. A polyamide nonwoven fabric was used as the separator. The electrolyte solution was an aqueous potassium hydroxide solution having a specific gravity of 1.30.

Figure 2:
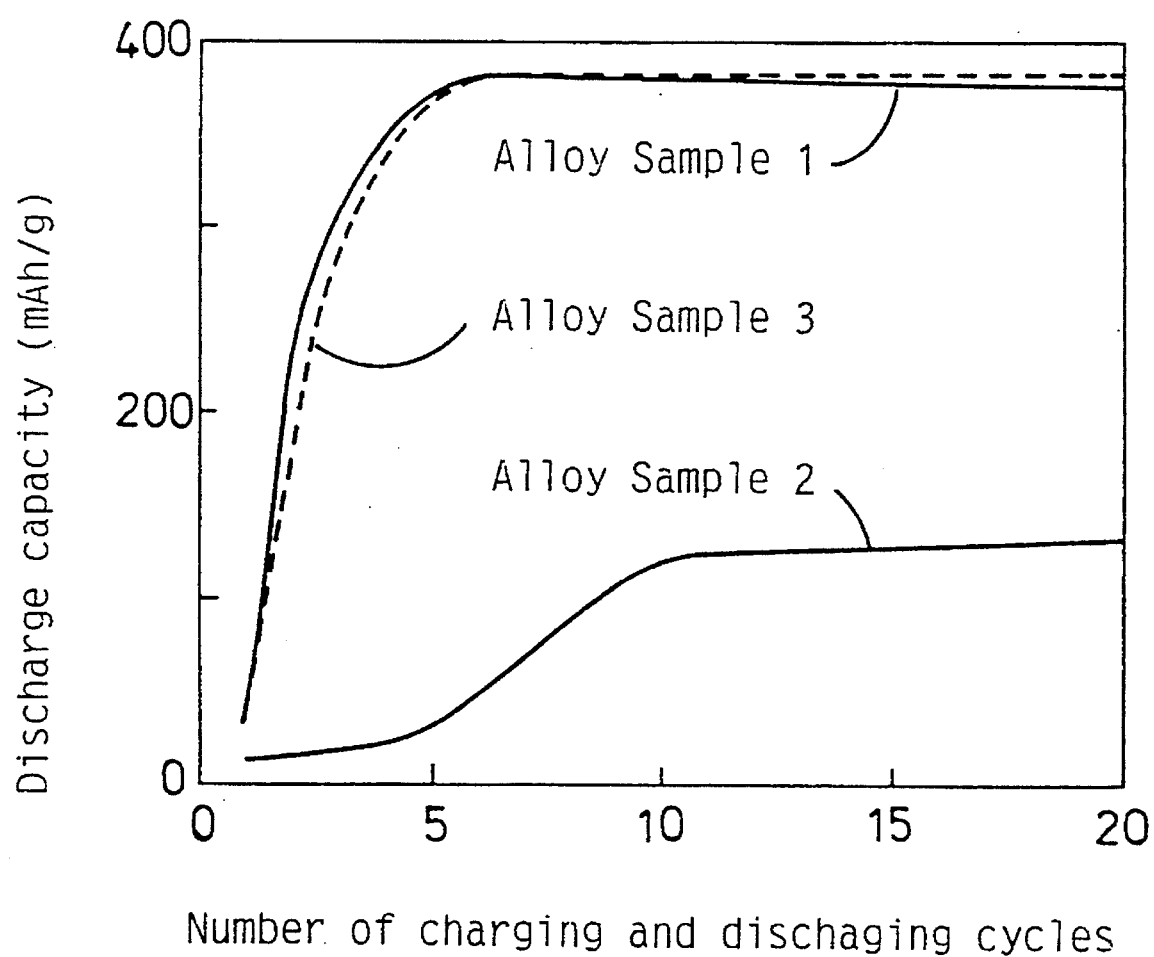
FIG. 2 is a graph showing charging and discharging cycle characteristics curves of the electrodes configured with the hydrogen storage alloys produced in accordance with the working example of the present invention and with comparative preparations.

Each of the half-cells was subjected to repeated charging and discharging at 25° C. During the five hour charge period, a constant current of 100 mA was applied per gram of hydrogen storage alloy. Discharging was performed at a constant current of 50 mA per gram of hydrogen storage alloy, and continued until the cell voltage decreased to 0.8 Volts. The discharge capacity of the negative electrode was measured during each of the charging and discharging cycles. The results of the measurements are summarized in FIG. 2. In FIG. 2, the abscissa represents the number of the charging and discharging cycles, and the ordinate represents the discharge capacity per 1 g of the alloy, wherein each of numerals tagged to each of the curves represents each of Alloy Samples.

The half-cell tests shown in FIG. 2 revealed that Alloy Sample 1 demonstrated the discharge capacities of about 40 mAh/g at the first cycle, about 230 mAh/g at the second cycle, about 310 mAh/g at the third cycle, and the constant discharge capacity of about 380 mAh/g at the sixth cycle and thereafter.

In contrast to this, Alloy Sample 2 demonstrated substantially no increase in the discharge capacity until the third cycle but some increase after the fourth cycle. The discharge capacity of Alloy Sample 2 was however as low as 120 mAh/g even after the tenth cycle.

Alloy Sample 3 of this Working Example demonstrated a slightly lower value than that of Alloy Sample 1 in the discharge capacity until the fifth cycle. The value however increased to a constant value of 380 mAh/g at the seventh or eighth cycle and later which is substantially equal to that of Alloy Sample 1.

EXAMPLE 2

Preparation of Alloy Samples

In this example, Alloy Samples represented by the formula: $ZrTi_{0.2}Mn_{0.7}V_{0.1}Cr_{0.1}Ni_{1.3}$ were prepared in the following manner.

Alloy Sample 4 (Working Example):

First, each of the predetermined amounts of powders of 100 mesh or smaller of zirconium oxide, vanadium pentoxide, titanium dioxide, manganese dioxide, metal nickel and metal chromium were mixed together in a mortar, and the mixture thus obtained was calcined in an alumina crucible placed in the air at 1000° C. for 3 hours. After pulverizing, the calcined mixture was treated with hydrogen gas stream at 600° C. for 6 hours. By measuring the amount of the oxygen constituting the oxides contained in the powder after the reduction with the hydrogen gas, the amount of metal calcium required for reducing the oxides was determined. One point two (1.2) times as much as the amount of metal calcium required for reducing the oxides was added to the powder, and the combined mixture was calcined in a calcium oxide crucible under argon atmosphere at 1100° C. for 3 hours. After cooling down the calcined mixture to room temperature, thus the cooled mixture was then placed in an aqueous acetic acid solution of a concentration of about 10% by weight to remove excessive metal calcium and calcium oxide produced as the reaction product. As a result, a hydrogen storage alloy in particles having a size of 0.2 mm–0.5 mm was obtained.

Alloy Sample 5 (Comparative preparation 3):

Another hydrogen storage alloy was prepared by steps of melting the above-mentioned all metal materials in an arc melting furnace under argon atmosphere, cooling and subjecting the cooled melt to a heat treatment in a vacuum at 1100° C. for 12 hours.

Characterization of Alloy Samples

A powder X-ray diffraction measurement was performed on each of these hydrogen storage alloys. As a result of the measurement, it was confirmed that the main component of the alloy phase of each of Alloy Samples 4 and 5 was the C15-type Laves phase ($MgCu_2$-type fcc structure).

In Alloy Sample 5, a peak attributable to the Zr-Ni system alloy in its diffraction pattern was recognized at a diffraction angle 2θ of 38°–40°. In contrast to this, substantially no peak attributable to the Zr-Ni system alloy was recognized with Alloy Sample 4, and hence it was found to be an alloy having a very high homogeneity.

A P-C-T measurement was performed on each of Alloy Samples. An H/M value at 20° C. of Alloy Sample 5 was 1.25. That of Alloy Sample 4 was 1.21 which was slightly lower than that of Alloy Sample 5.

Half Cell Test

A half-cell test was performed on each of the above-mentioned Alloy Samples in a similar manner to that of Example 1. As the result of the half-cell test, it was found that an electrode produced by using Alloy Sample 5 demonstrated the discharge capacity of 390 mAh/g at the fourth cycle. An electrode of Alloy Sample 4 demonstrated a discharge capacity of 384 mAh/g at the fifth cycle.

EXAMPLE 3

Preparation of Alloy Sample

Commercially available zirconium oxide ($ZrO_2$), vanadium pentoxide ($V_2O_5$), electrolytic metal manganese in a sheet having a size of 10 mm×10 mm or smaller, metal nickel having a diameter of 10 mm or smaller, metal cobalt and metal calcium were used to prepare Alloy Sample 6 represented by the formula: $ZrMn_{0.6}V_{0.2}Co_{0.1}Ni_{1.2}$.

Alloy Sample 6 (Working Example):

First, to a mixture composed of each of zirconium oxide, vanadium pentoxide, metal manganese, metal cobalt and metal nickel in an amount defined by the alloy composition, were added metal calcium in an amount required for reducing the above-mentioned oxides and zirconium oxide of an amount which corresponds to 5 mole % of the above-mentioned zirconium oxide. These were placed in a calcium oxide crucible and melted by means of a high frequency melting furnace under argon atmosphere to synthesize an alloy. By removing a slag floating over the melt of the synthesized alloy, pouring the molten alloy into a casting die, and cooling the content in the die rapidly, the aimed alloy was produced. In this Working Example, the molten alloy was cooled by dropping it onto a hollow copper plate through which cooling water was circulated, in order to approximate the cooling speed of the alloy to that of the alloy produced in an arc melting furnace. In addition to this, shape of the alloy after cooling was made to be a disk having a diameter of about 12 cm and a thickness of about 5 mm, which was equivalent to that was produced in the arc melting furnace. The thus cooled alloy was then subjected to a heat treatment in a vacuum at 1100° C. for 12 hours to obtain Alloy Sample 6.

Incidentally, the cooling speed of the alloy exerts a great influence on the characteristics of the obtained alloy. If the thickness of the alloy mass at the cooling exceeds 2 cm, a layer having a large segregation phase of the Zr-Ni system alloy should be produced at an approximate center of the alloy mass. The amount of hydrogen stored in the alloy having the segregation phase is decreased by about 20% in comparison with that of an alloy produced in a rapid cooling speed.

Characterization of Alloy Samples

First, a powder X-ray diffraction measurement was performed on Alloy Sample 6. As a result of the comparison of the measurement with those of Alloy Samples 1 and 2, it was confirmed that the main component of the alloy phase of Alloy Sample 6 was the C15-type Laves phase ($MgCu_2$-type fcc structure). Alloy Sample 6 had a substantially the same diffraction pattern as those of Alloy Samples 1 and 2 and a peak attributable to the Zr-Ni system alloy was recognized at a diffraction angle 2θ of 38°–40°. Further, a crystal lattice constant of Alloy Sample 6 was found to be 7.06Å which is the same as that of Alloy Sample 1.

Figure 3:
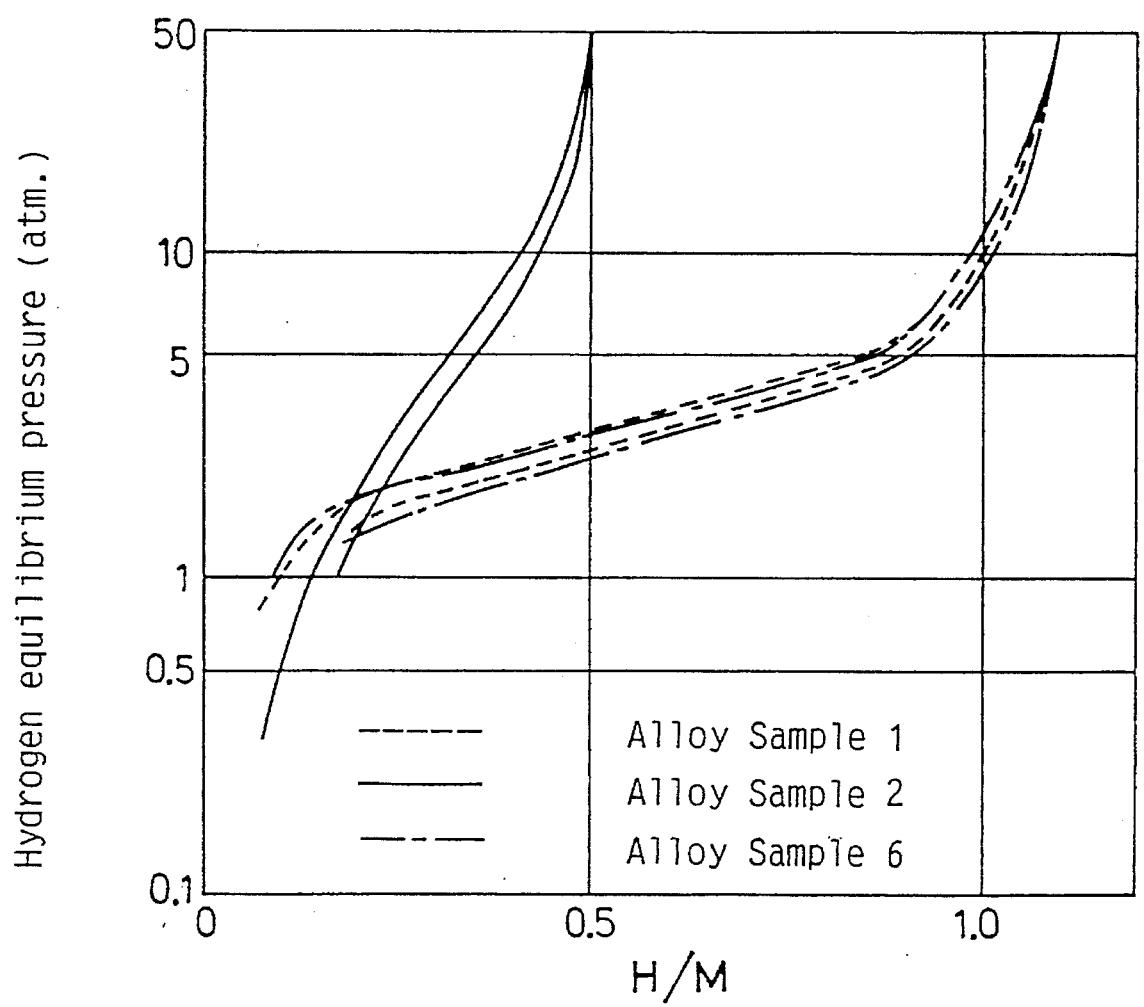
FIG. 3 is a graph showing P-C-T characteristics curves of hydrogen storage alloys produced in accordance with another working example of the present invention and with the comparative preparations.

A P-C-T measurement was performed on each of Alloy Samples and the results thereof at 70° C. were shown in FIG. 3. As shown in FIG. 3, it was found that the P-C-T curve of Alloy Sample 6 was substantially the same as that of Alloy Sample 1.

Half Cell Test

Figure 4:
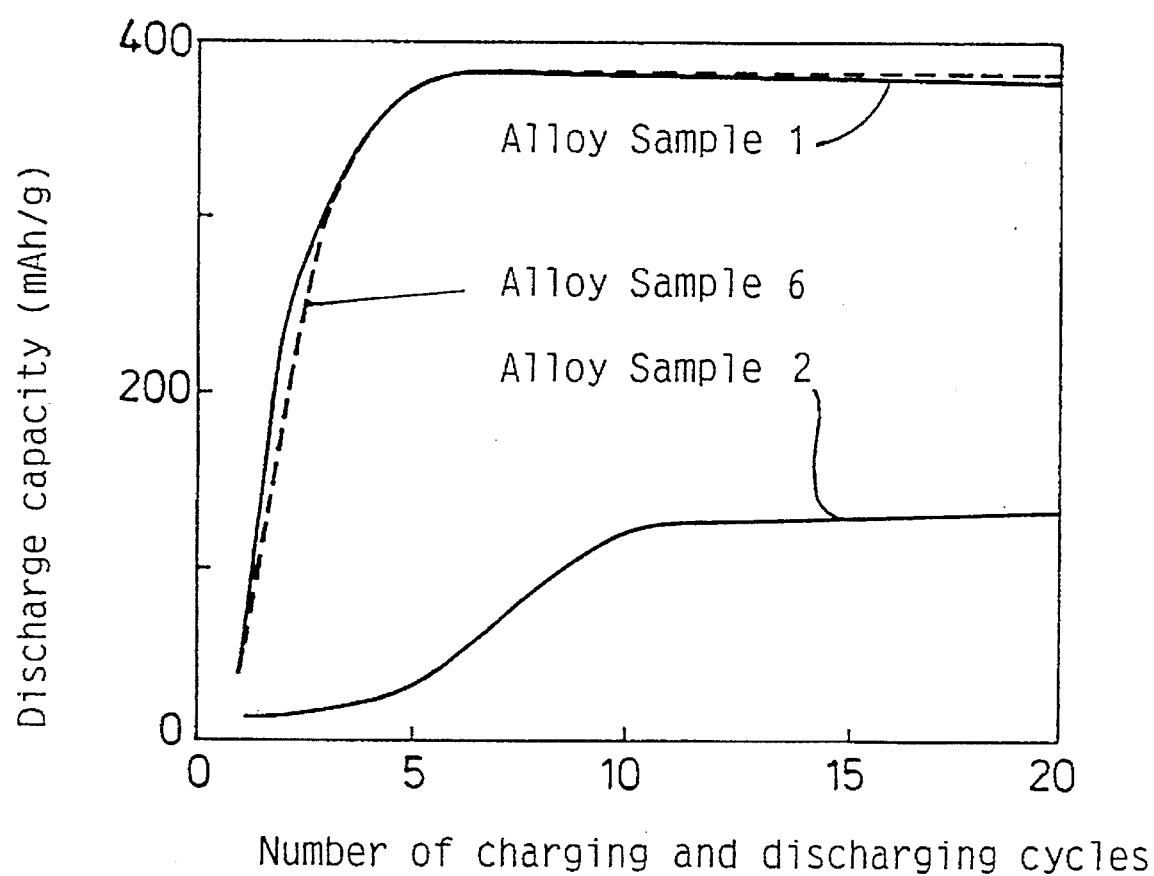
FIG. 4 is a graph showing charging and discharging cycle characteristics curves of the electrodes configured with the hydrogen storage alloys produced in accordance with the working example of the present invention and with the comparative preparations.

An electrode was produced by using Alloy Sample 6 in a similar manner to that of Example 1 and subjected to a half-cell test as that in Example 1, in order to evaluate the electrode characteristics as the negative electrode of the alkaline rechargeable battery. The result of the half-cell test was shown in FIG. 4. As clearly shown by FIG. 4, it was confirmed that Alloy Sample 6 demonstrated the electrode characteristics which were substantially the same as those of Alloy Sample 1.

In view of the raw material cost, it is advantageous to make the amount of zirconium oxide remained after the synthesis of the hydrogen storage alloy as small as possible.

EXAMPLE 4

Preparation of Alloy Samples

Commercially available sponge metal zirconium, vanadium pentoxide, electrolytic metal manganese in a sheet having a size of 10 mm×10 mm or smaller, metal chromium in a sheet, metal nickel, metal cobalt and metal calcium were used to prepare the alloy whose composition is represented by the formula: $ZrMn_{0.55}V_{0.15}Cr_{0.1}Co_{0.1}Ni_{1.2}$. Apart from this, another alloy of Comparative preparation 4 in the same alloy composition was prepared by using metal aluminum as the reducing agent in place of metal calcium.

Alloy Sample 7 (Working Example):

First, to a mixture composed of each of metal zirconium, vanadium pentoxide, metal manganese, metal chromium, metal cobalt and metal nickel in an amount defined by the alloy composition, were added metal calcium in an amount required for reducing the above-mentioned vanadium pentoxide, as well as zirconium oxide of an amount which corresponds to 5 mole % of the above-mentioned zirconium. These materials were placed in a calcium oxide crucible and melted by means of a high frequency melting furnace under argon atmosphere to synthesize an alloy. By removing a slag floating over the melt of the synthesized alloy, pouring the molten alloy into a casting die, and cooling the content in the die rapidly, the aimed alloy was produced. In this Working Example, the molten alloy was cooled in a similar manner to that in Example 3, in order to approximate the cooling speed of the alloy to that of the alloy produced in an arc melting furnace. The thus cooled alloy was then subjected to a heat treatment under vacuum at 1100° C. for 12 hours to obtain Alloy Sample 7.

Alloy Sample 8 (Comparative preparation 5):

Another alloy of the same composition was prepared in the same production process as that of the above-mentioned one except for the use of metal aluminum in place of metal calcium.

Characterization of Alloy Samples

First, a powder X-ray diffraction measurement was performed on each of Alloy Samples 7 and 8. As a result of the measurement, it was confirmed that the main component of the alloy phase of Alloy Sample 7 was the C15-type Laves phase ($MgCu_2$-type fcc structure). In the diffraction pattern of Alloy Sample 8, there was recognized a peak attributable to another alloy in addition to that of the C15-type Laves phase.

A P-C-T measurement was performed on each of Alloy Samples. An H/M value of Alloy Sample 7 at 20° C. was 1.21 and its plateau pressure at 70° C. was about 4 atom. In contrast to this, an H/M value of Alloy Sample 8 at 20° C. was 0.86 and its plateau pressure at 70° C. was about 33 atom. From these results, it was appreciated that the process of alloy production, which uses metal aluminum as the reducing agent in place of metal calcium, seriously deteriorated the characteristics of the produced alloy.

In order to investigate the serious deterioration on the hydrogen gas storing characteristics of Alloy Sample 8, an elemental analysis was performed on Alloy Sample 8. As a result of this elemental analysis, it was appreciated that the amount of zirconium contained in Alloy Sample 8 was smaller than that in the aimed alloy composition and aluminum was contained in a large quantity. Due to this fact, it was appreciated that a ratio B/A, i.e., that of the total numbers of atoms (B) of Mn, V, Cr, Co and Ni to the number of atoms (A) of Zr in Alloy Sample 8 became about 3, which was greater than 2.1 of the aimed alloy composition. It was believed that this deviation in the alloy composition was responsible to the great raise of the plateau pressure in the hydrogen gas storing characteristics curve and to the deterioration in the hydrogen gas storing amount of Alloy Sample 8.

Half-Cell Test

An electrode was produced by using each of Alloy Samples 7 and 8 in a similar manner to that of Example 1 and subjected to a half-cell test as in Example 1. As a result of the half-cell test, it was confirmed that the electrode using Alloy Sample 7 demonstrated a discharge capacity of 372 mAh/g at eighth cycle. In contrast to this, a discharge capacity of the electrode using Alloy Sample 8 was found to be as low as 281 mAh/g at 14th cycle.

EXAMPLE 5

Preparation of Alloy Samples

Commercially available zirconium oxide, titanium dioxide, vanadium pentoxide, an oxide of misch metal (Mm: a mixture of rare earth element consisting mainly of Ce and La), metal manganese in a sheet having a size of 10 mm×10 mm or smaller, metal chromium in a sheet, metal nickel, metal cobalt and metal calcium were used to prepare the alloy whose composition is represented by the formula: $Zr_{0.8}Ti_{0.4}Mn_{0.5}V_{0.2}Cr_{0.2}Co_{0.1}Ni_{1.3}$ (95% by weight)+ $MmNi_2$ (5% by weight).

Alloy Sample 9 (Working Example):

First, to a mixture composed of each of zirconium oxide, titanium dioxide, vanadium pentoxide, the oxide of the misch metal, metal manganese, metal chromium, metal cobalt and metal nickel in an amount defined by the alloy composition, were added metal calcium in an amount required for reducing the above-mentioned oxides, and zirconium oxide containing zirconium of a molar amount which corresponds to 5% of a sum of the molar amounts of the zirconium and titanium contained in the above-mentioned zirconium oxide and titanium dioxide. These were placed in a calcium oxide crucible and melted by means of a high frequency melting furnace under argon atmosphere to synthesize an alloy. After removing a slag floating over the melt of the synthesized alloy, and pouring the molten alloy into a casting die, the contents in the die was cooled down rapidly to produce the aimed alloy. In this Working Example, the molten alloy was cooled in a similar manner to that in Example 3, in order to approximate the cooling speed of the alloy to that of the alloy produced in an arc melting furnace. The thus cooled alloy was then subjected to a heat treatment under vacuum at 1100° C. for 12 hours, to obtain Alloy Sample 9.

Alloy Sample 10 (Comparative preparation 5):

Another hydrogen storage alloy having the same composition was prepared in an arc melting furnace.

Characterization of Alloy Samples

First, a powder X-ray diffraction measurement was performed on each of Alloy Samples 9 and 10. As a result of the measurement, it was confirmed that the main component of the alloy phase of the both Alloy Samples was of the C15-type Laves phase ($MgCu_2$-type fcc structure), and the both Alloy Samples had the same crystal lattice constant of 7.07Å.

A P-C-T measurement was performed on each of Alloy Samples. Each of Alloy Samples 9 and 10 had the same H/M value of 1.25 at 20° C. under hydrogen pressure of 50 atm.

Half Cell Test

As a result of the half-cell test performed in a similar manner to that of Example 1 on an electrode produced with each of Alloy Samples 9 and 10, it was confirmed that the electrode produced by using either of the alloys demonstrated a discharge capacity of 380–390 mAh/g at fourth cycle.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for producing a multi-component hydrogen storage alloy including at least one element selected from the group consisting of zirconium and vanadium, wherein a raw material including at least one of zirconium and vanadium in its oxide form and further including at least one metal or metal oxide other than zirconium and vanadium in their oxide form, where said at least one metal is present in said alloy, is subjected to calcining in an atmosphere containing oxygen and then to heating in the presence of metal calcium under an inert gas atmosphere up to a temperature at which at least metal calcium melts but below a temperature at which the raw material completely melts, thereby reducing the oxides in said raw material.

2. The method for producing a multi-component hydrogen storage alloy in accordance with claim 1, wherein said multi-component hydrogen storage alloy is represented by the formula: $ZrMn_wV_xNi_yM_z$ (where M represents at least one element selected from the group consisting of B, Al, Si, Cr, Fe, Co, Cu, Zn, Nb, Mo, Ta and W; $0.3 \leq w \leq 1.0$, $0 < x \leq 0.4$, $0.9 \leq y \leq 1.5$, $0 < z \leq 1.0$, and $1.8 \leq w+x+y+z \leq 2.4$), wherein said raw material contains said elements Zr, Mn, V, Ni and M and said alloy has a face centered cubic crystal structure of $MgCu_2$ as a main alloy phase, and a lattice constant "a" such that $7.05Å \leq a \leq 7.10Å$.

3. The method for producing a multi-component hydrogen storage alloy in accordance with claim 2, wherein said multi-component hydrogen storage alloy includes an alloy phase having a main component of Ln (lanthanide elements) and Ni in 30% by weight or smaller, wherein said raw material contains said lanthanide elements and Ni.

4. The method for producing a multi-component hydrogen storage alloy in accordance with claim 1, wherein said multi-component hydrogen storage alloy is represented by the formula: $Zr_{1-a}Ti_aMn_wV_xNi_yM_z$ (where M represents at least one element selected from the group consisting of B, Al, Si, Cr, Fe, Co, Cu, Zn, Nb, Mo, Ta and W, $0.1 \leq a \leq 1.2$, $0.3 \leq w \leq 1.0$, $0 < x \leq 0.4$, $0.9 \leq y \leq 1.6$, $0 < z \leq 1.0$ and $1.7 \leq w+x+y+z \leq 2.7$) wherein said raw material contains said elements Zr, Ti, Mn, Ni and M, and said alloy has a hexagonal crystal structure of $MgZn_2$ or a face centered cubic crystal structure of $MgCu_2$ as a main alloy phase.

5. The method for producing a multi-component hydrogen storage alloy in accordance with claim 4, wherein said multi-component hydrogen storage alloy includes an alloy phase having a main component of Ln (lanthanide elements) and Ni in 30% by weight or smaller, wherein said raw material contains said lanthanide elements and Ni.

6. The method for producing a multi-component hydrogen storage alloy in accordance with claim 1, wherein said calcining is performed at a temperature ranging from 900° C. to 1300° C.

7. The method for producing a multi-component hydrogen storage alloy in accordance with claim 6, further comprising, after said calcining and in advance of said heating, an additional step of calcining said calcined raw material under reducing gas atmosphere at a temperature ranging from 350° C. to 900° C.

8. The method for producing a multi-component hydrogen storage alloy in accordance with claim 7, wherein the amount of said metal calcium to be mixed with the raw material is in excess of stoichiometric amount required for reducing the oxides in the raw material, further comprising a step of removing the metal calcium and calcium oxide remaining in the mixture after the step of reducing the oxides.

9. The method for producing a multi-component hydrogen storage alloy in accordance with claim 7, wherein said multi-component hydrogen storage alloy is represented by the formula: $ZrMn_wV_xNi_yM_z$ (where M represents at least one element selected from the group consisting of B, Al, Si, Cr, Fe, Co, Cu, Zn, Nb, Mo, Ta and W, $0.3 \leq w \leq 1.0$, $0 < x \leq 0.4$, $0.9 \leq y \leq 1.5$, $0 < z \leq 1.0$, and $1.8 \leq w+x+y+z \leq 2.4$) wherein said raw material contains said elements Zr, Mn, V, Ni and M, and said alloy has a face centered cubic crystal structure of $MgCu_2$ as a main alloy phase, and a lattice constant "a" such that $7.05Å \leq a \leq 7.10Å$.

10. The method for producing a multi-component hydrogen storage alloy in accordance with claim 7; wherein said multi-component hydrogen storage alloy is represented by the formula: $Zr_{1-a}Ti_aMn_wV_xNi_yM_z$ (where M represents at least one element selected from the group consisting of B, Al, Si, Cr, Fe, Co, Cu, Zn, Nb, Mo, Ta and W, $0.1 \leq a < 1.2$, $0.3 \leq w \leq 1.0$, $0 < x \leq 0.4$, $0.9 \leq y \leq 1.6$, $0 < z \leq 1.0$ and $1.7 \leq w+x+y+z \leq 2.7$) wherein said new material contains said elements Zr, Ti, Mn, V, Ni and M, and said alloy has a hexagonal crystal structure of $MgZn_2$ or a face centered cubic crystal structure of $MgCu_2$ as a main alloy phase.

11. The method for producing a multi-component hydrogen storage alloy in accordance with claim 6, wherein the amount of said metal calcium to be mixed with the raw material is in excess of stoichiometric amount required for reducing the oxides in the raw material, further comprising a step of removing the metal calcium and calcium oxide remaining in the mixture after the step of reducing the oxides.

12. The method for producing a multi-component hydrogen storage alloy in accordance with claim 6, wherein said multi-component hydrogen storage alloy is represented by the formula: $ZrMn_wV_xNi_yM_z$ (where M represents at least one element selected from the group consisting of B, Al, Si, Cr, Fe, Co, Cu, Zn, Nb, Mo, Ta and W, $0.3 \leq w \leq 1.0$, $0 < x \leq 0.4$, $0.9 \leq y \leq 1.5$, $0 < z \leq 1.0$, and $1.8 \leq w+x+y+x \leq 2.4$) wherein said raw material contains said elements Zr, Mn, V, Ni and M, and said alloy has a face centered cubic crystal structure of $MgCu_2$ as a main alloy phase, and a lattice constant "a" such that $7.05521 \leq a \leq 7.10Å$.

13. The method for producing a multi-component hydrogen storage alloy in accordance with claim 6; wherein said multi-component hydrogen storage alloy is represented by the formula: $Zr_{1-a}Ti_aMn_wV_xNi_yM_z$ (where M represents at least one element selected from the group consisting of B, Al, Si, Cr, Fe, Co, Cu, Zn, Nb, Mo, Ta and W, $0.1 \leq a < 1.2$, $0.3 \leq w \leq 1.0$, $0 < x \leq 0.4$, $0.9 \leq y \leq 1.6$, $0 < z \leq 1.0$ and $1.7 \leq w+x+y+z \leq 2.7$) wherein said raw material contains said elements Zr, Ti, Mn, V, Ni and M, and said alloy has a hexagonal crystal structure of $MgZn_2$ or a face centered cubic crystal structure of $MgCu_2$ as a main alloy phase.

14. A method for producing a multi-component hydrogen storage alloy including zirconium, wherein a raw material including zirconium in its oxide form and further including at least one metal or its oxide other than zirconium in its oxide form, where said at least one metal is present in said alloy, is subjected to calcining in an atmosphere containing oxygen and then to heating in the presence of metal calcium under an inert gas atmosphere up to a temperature at which at least metal calcium melts, thereby reducing the oxides in said raw material, wherein said heating is a step of heating and melting a mixture comprising (i) a raw material which includes zirconium in its oxide form, (ii) metal calcium in an amount required for reducing the oxides included in said raw material, and (iii) additional oxide of zirconium in an amount up to 10 mole % of the amount of the first-mentioned zirconium, under inert gas atmosphere.

15. The method for producing a multi-component hydrogen storage alloy in accordance with claim 14, wherein said multi-component hydrogen storage alloy is represented by the formula: $ZrMn_wV_xNi_yM_z$ (where M represents at least one element selected from the group consisting of B, Al, Si, Cr, Fe, Co, Cu, Zn, Nb, Mo, Ta and W, $0.3 \leq w \leq 1.0$, $0 < x \leq 0.4$, $0.9 \leq y \leq 1.5$, $0 < z \leq 1.0$, and $1.8 \leq w+x+y+z \leq 2.4$) wherein said raw material contains said elements Zr, Mn, V, Ni and M, and said alloy has a face centered cubic crystal structure of $MgCu_2$ as a main alloy phase, and a lattice constant "a" such that $7.05Å \leq a \leq 7.10Å$.

16. The method for producing a multi-component hydrogen storage alloy in accordance with claim 14; wherein said multi-component hydrogen storage alloy is represented by the formula: $Zr_{1-a}Ti_aMn_wV_xNi_yM_z$ (where M represents at least one element selected from the group consisting of B, Al, Si, Cr, Fe, Co, Cu, Zn, Nb, Mo, Ta and W, $0.1 \leq a < 1.2$, $0.3 \leq w \leq 1.0$, $0 < x \leq 0.4$, $0.9 \leq y \leq 1.6$, $0 < z \leq 1.0$ and $1.7 \leq w+x+y+z \leq 2.7$) wherein said raw material contains said elements Zr, Ti, Mn, V, Ni and M, and said alloy has a hexagonal crystal structure of $MgZn_2$ or a face centered cubic crystal structure of $MgCu_2$ as a main alloy phase.

17. A method for producing a multi-component hydrogen storage alloy including zirconium and titanium, wherein a raw material including zirconium and titanium in their oxide forms and further including at least one metal or its oxide other than zirconium and titanium in their oxide forms, where said at least one metal or is present in said alloy, is subjected to calcining in an atmosphere containing oxygen and then to heating in the presence of metal calcium under inert gas atmosphere up to a temperature at which at least metal calcium melts, thereby reducing the oxides in said raw material, wherein said heating is a step of heating and melting a mixture comprising (i) a raw material which includes zirconium and titanium in their oxide forms, (ii) metal calcium in an amount required for reducing the oxides included in said raw material, and (iii) additional oxide of zirconium in a molar amount which corresponds to 10% or smaller of a sum of the molar amounts of the first-mentioned zirconium and titanium, under inert gas atmosphere.

18. The method for producing a multi-component hydrogen storage alloy in accordance with claim 17, wherein said multi-component hydrogen storage alloy is represented by the formula: $ZrMn_wV_xNi_yM_z$ (where M represents at least one element selected from the group consisting of B, Al, Si, Cr, Fe, Co, Cu, Zn, Nb, Mo, Ta and W, $0.3 \leq w \leq 1.0$, $0 < x \leq 0.4$, $0.9 \leq y \leq 1.5$, $0 < z \leq 1.0$, and $1.8 \leq w+x+y+z \leq 2.4$) wherein said raw material contains said elements Zr, Mn, V, Ni and M, and said alloy has a face centered cubic crystal structure of $MgCu_2$ as a main alloy phase, and a lattice constant "a" such that $7.05Å \leq a \leq 7.10Å$.

19. The method for producing a multi-component hydrogen storage alloy in accordance with claim 17; wherein said multi-component hydrogen storage alloy is represented by the formula: $Zr_{1-a}Ti_aMn_wV_xNi_yM_z$ (where M represents at least one element selected from the group consisting of B, Al, Si, Cr, Fe, Co, Cu, Zn, Nb, Mo, Ta and W, $0.1 \leq a < 1.2$, $0.3 \leq w \leq 1.0$, $0 < x \leq 0.4$, $0.9 \leq y \leq 1.6$, $0 < z \leq 1.0$ and $1.7 \leq w+x+y+z \leq 2.7$) wherein said raw material contains said elements Zr, Ti, Mn, V, Ni and M, and said alloy has a hexagonal crystal structure of $MgZn_2$ or a face centered cubic crystal structure of $MgCu_2$ as a main alloy phase.

* * * * *